DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 26, 1973

911 O.G. 1138

T911,018
QUICK CHANGE ADAPTER FOR RIPPER SHANKS AND THE LIKE WITH TIP ANGLE ADJUSTMENT

Michael T. Radigan, Rte. 1, Diane Way, Manhattan, Ill. 60442

Filed July 28, 1972, Ser. No. 276,179
**Int. Cl. E02f *9/28***
U.S. Cl. 37—142 R
2 Sheets Drawing. 10 Pages Specification

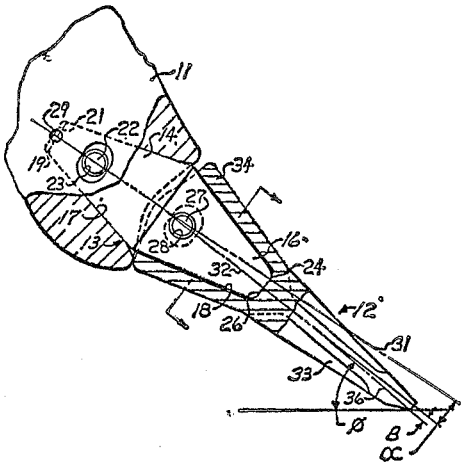

Figure 1:
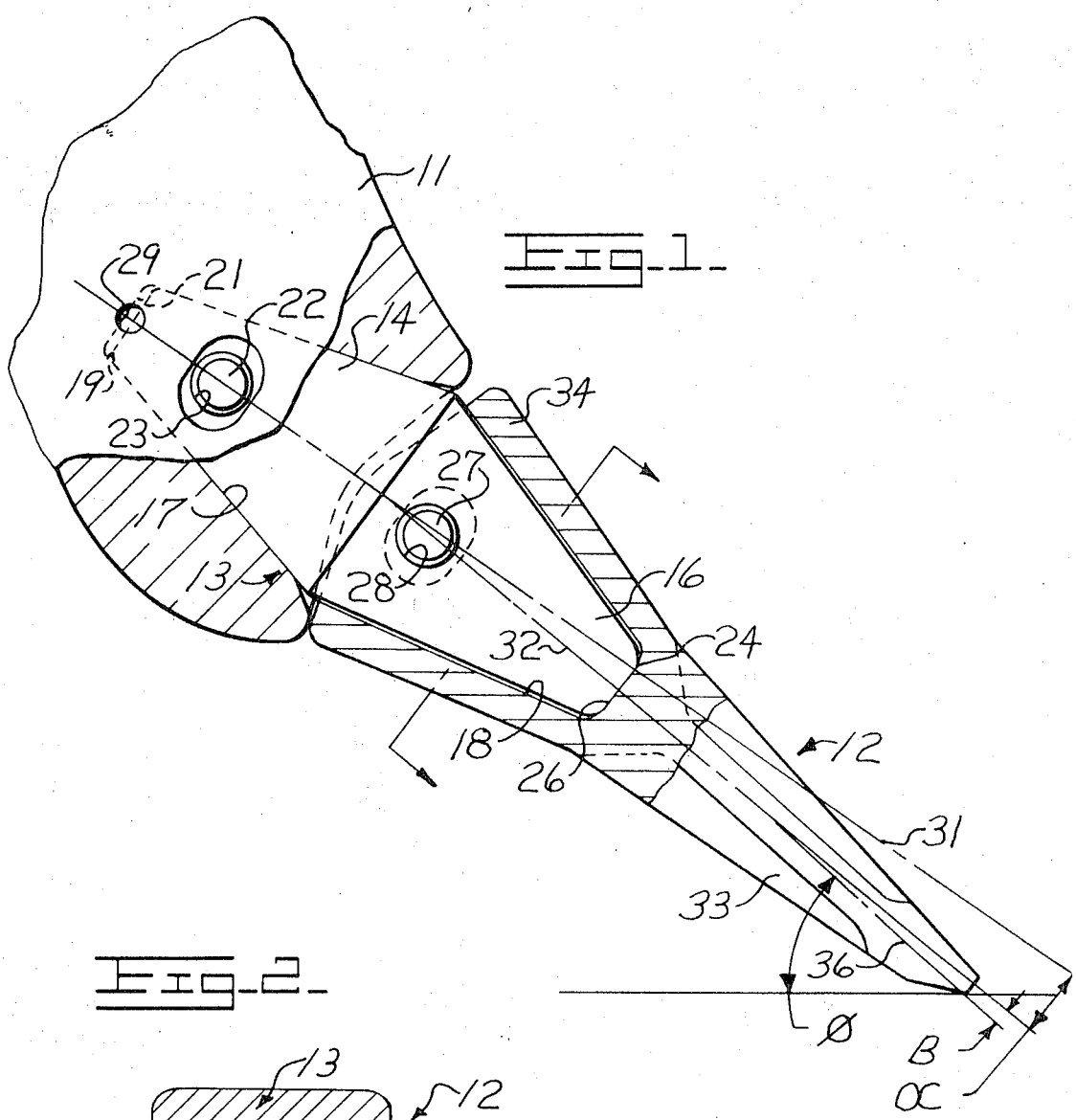
Figure 2:
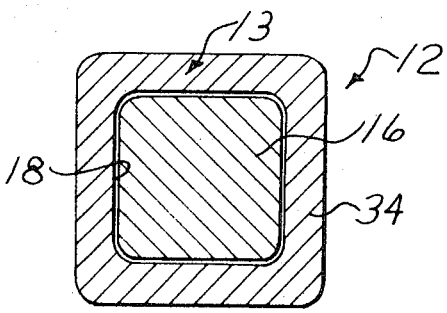
Figure 3:
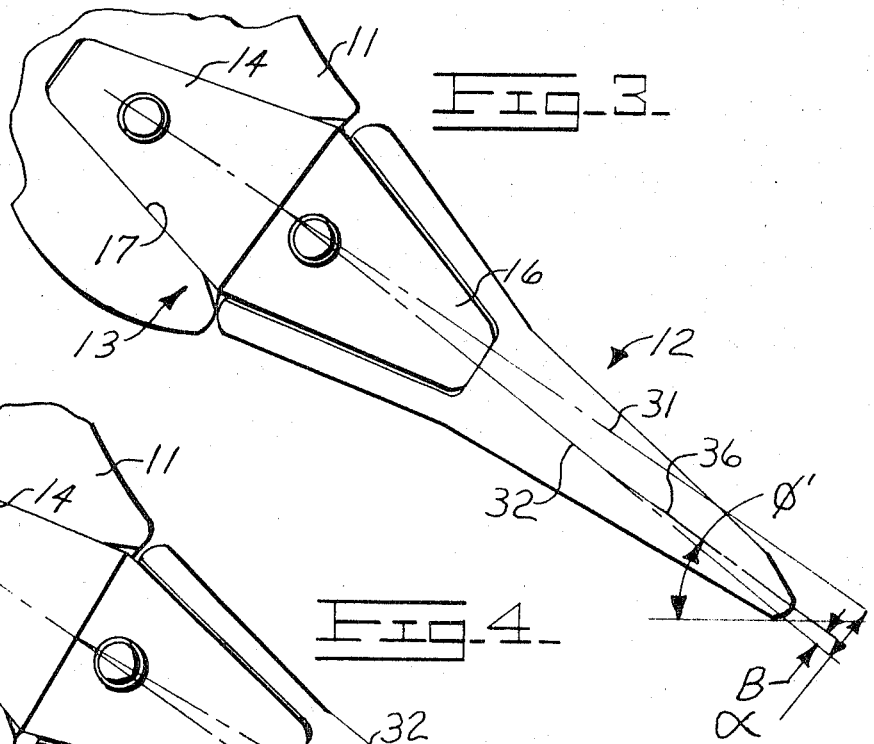
Figure 4:
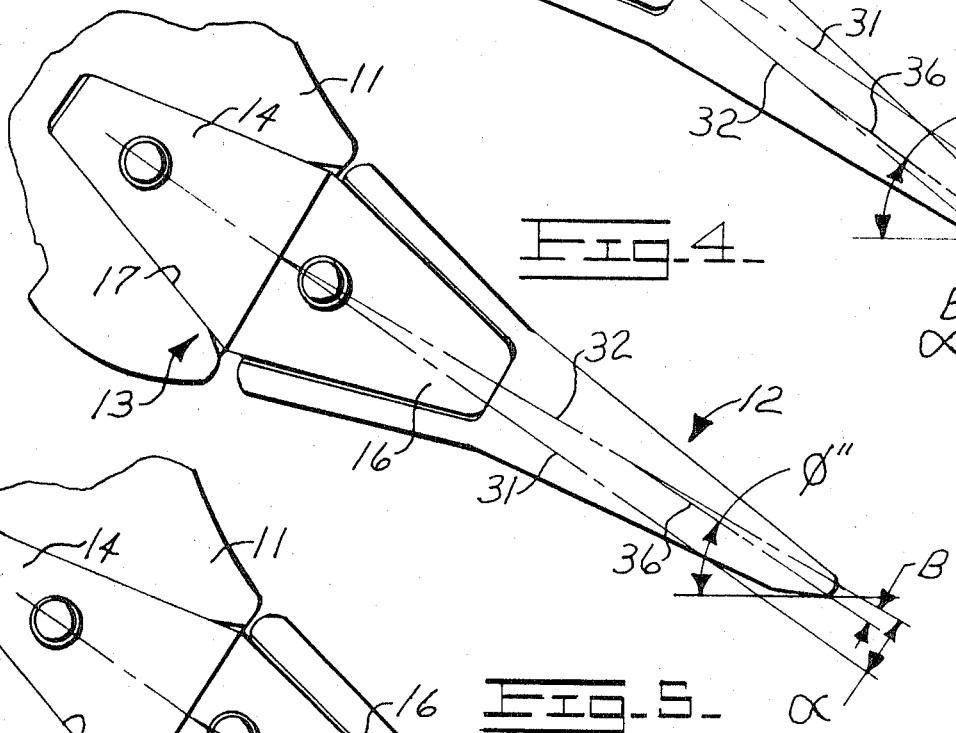
Figure 5:
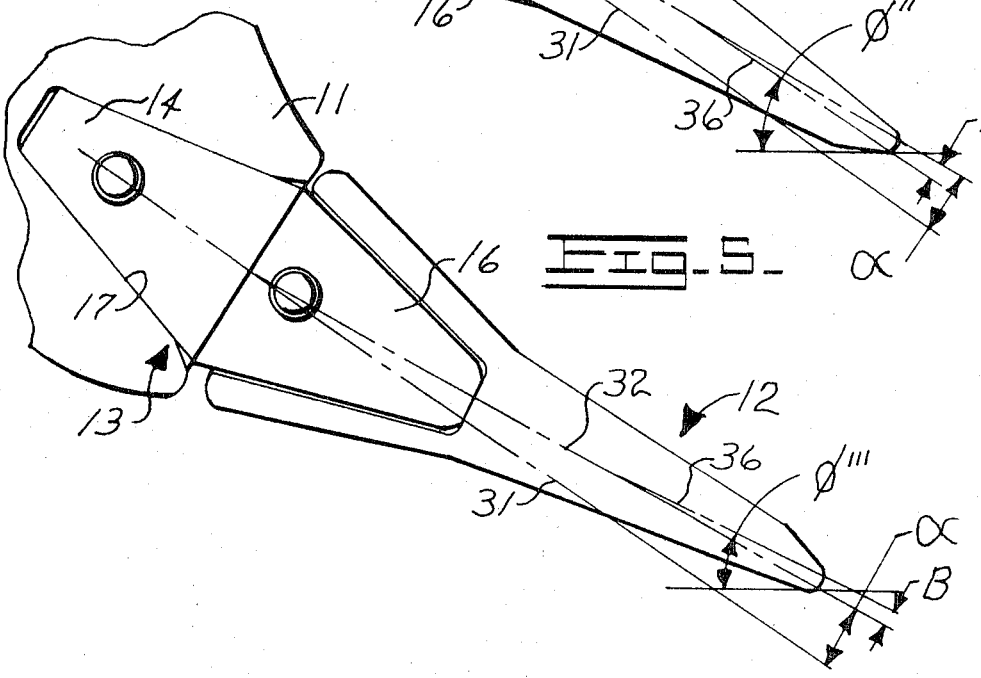

An adapter for securing a ground engaging tooth to a support such as a ripper shank wherein the adapter is of double frusto-pyramidal configuration with one end removably secured in a socket in the support and the opposite end removably secured in a mating socket of the ground engaging tooth. The opposite frusto-pyramidal ends of the adapter as shown in FIG. 1 are askew of one another such that by rotation of the adapter 180° in the support socket, two different tooth tip angles with respect to the ground surface are obtained. The ground engaging tip end of the tooth may also be askew from the socket portion thereof whereby rotation of the tooth 180° on the leading frusto-pyramidal end of the adapter provides two different tip angles with respect to the ground surface for each of the reversible positions of the adapter in the support socket, i.e., a total of four different tip angle adjustments.

June 26, 1973 M. T. RADIGAN T911,018

QUICK CHANGE ADAPTER FOR RIPPER SHANKS AND THE LIKE WITH TIP ANGLE ADJUSTMENT

Filed July 28, 1972 2 Sheets-Sheet 1